June 24, 1924.
L. T. HINTON
TIRE CHAIN FASTENER
Filed Sept. 15, 1923
1,498,629
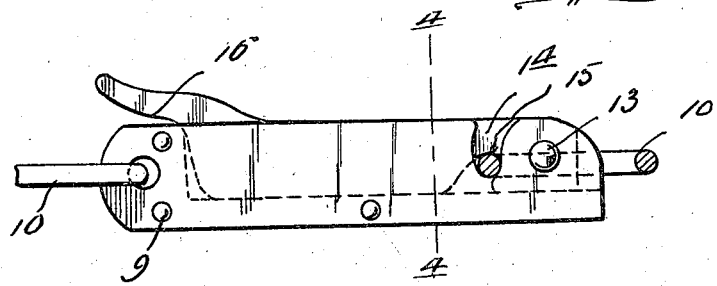
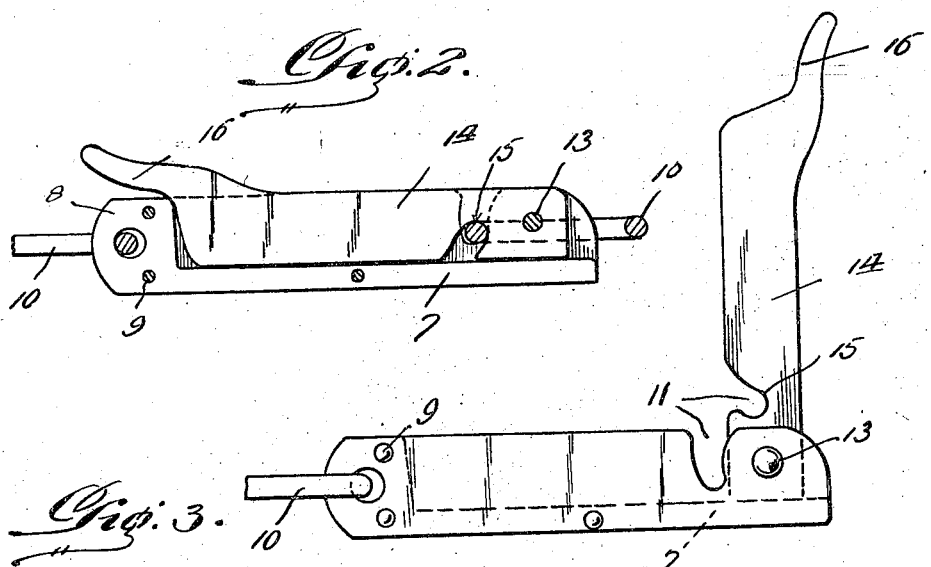
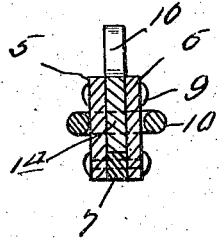
L. T. Hinton,
Inventor Patented June 24, 1924.

1,498,629

UNITED STATES PATENT OFFICE.

LEONARD T. HINTON, OF ARKANSAS CITY, KANSAS.

TIRE-CHAIN FASTENER.

Application filed September 15, 1923. Serial No. 662,824.

*To all whom it may concern:*

Be it known that I, LEONARD T. HINTON, a citizen of the United States, residing at Arkansas City, in the county of Cowley and State of Kansas, have invented certain new and useful Improvements in Tire-Chain Fasteners, of which the following is a specification.

In carrying out the present invention it is my purpose to provide a fastener for the chains of tires wherein these chains may be fastened upon the tires in a novel, simple and expeditious manner, and wherein the liability of the same becoming unfastened at their ends is substantially negligent, the nature of this fastener being such that the greater the tension applied to the chain the less the liability of the fastener becoming inoperative.

The primary object of this invention resides in the provision of a fastener for tire chains that is extremely simple of construction and efficient in operation, and one that may be manufactured and marketed at extremely small cost.

A still further object of my invention resides in the provision of such a fastener for tire chains wherein the ends of the tire chain may be brought together and into tight engagement with the tire even though the chain is slightly smaller than is supposed to be used upon a particular size tire.

With the above and other objects in view as the nature of the invention is better understood, the same comprises the novel form, combination and arrangement of parts set forth in the following specification, shown in the accompanying drawing and claimed.

In the drawing wherein like reference characters indicate corresponding parts throughout the several views, Figure 1 is a side elevational view of my improved chain fastener applied, Figure 2 is a detail longitudinal cross section thereof, Figure 3 is a view of the fastener in an open position, when applied, and Figure 4 is a transverse cross section taken substantially upon the line 4—4 of Figure 1.

Now having particular reference to the drawing, my novel fastener for tire chains comprises a pair of relatively elongated plates 5 and 6 of similar shape and dimensions between which is to be positioned at the lower edge thereof, a spacer strip 7 that is formed at one end with an enlargement 8, this spacer strip and the plate elements 5 and 6 being secured together through the medium of a desirable number of rivets 9. These plates 5 and 6 as well as the enlargement 8 of the spacer strip 7 are provided with alined openings through which is to be engaged one end link of the tire chain designated generally 10. At the forward end of the fastener, the said plates 5 and 6 are formed at their top edges with alined notches 11 that are curved in a forward direction at their lower ends whereby the link of the opposite end of the chain 10 when forced into these notches will be prevented from casually disengaging therefrom as is obvious from a consideration of Figure 2.

Pivotally secured at its front end between the plates 5 and 6 and adjacent the front ends thereof at 13 is a blade 14 that is adapted to be swung rearwardly for positioning between said plates 5 and 6 above said spacing strip 7 after this end link of said chain has been engaged within a notch 15 at the bottom edge of the blade, this notch being also hook-shaped for preventing the disengagement of the link therefrom as said blade is being moved rearwardly to the position of Figure 2. For assisting in the swinging movement of said blade 14, the free end thereof is provided at its upper edge with an extension finger 16.

It will also be seen that the filler strip 7 affords a spring retaining means for the blade 14 for retaining the same against accidental swinging movement to a closed or opened position or in the positions shown in the different figures, this element working after the fashion of the usual spring for knife blades found in practically all types of penknives.

In view of the above description when considered in conjunction with the accompanying drawing, it will be at once apparent that I have provided a highly novel and simplified form of tire chain fastener and one that will meet with all of the requirements for a successful commercial use.

Even though I have herein set forth the most practical embodiment of the invention with which I am at the present time familiar, it is nevertheless to be understood that minor changes may be made within the invention without departing from the spirit and scope of the appended claim.

Having thus described my invention, what

I claim as new, and desire to secure by Letters Patent is:—

A tire chain fastener comprising spaced plates having straight parallel longitudinal edges, a spacer located between the plates and having a strip with a free end resilient portion, one edge of the strip being flush with one set of edges of the plates and the opposite edge of the strip being parallel with and spaced from the opposite edges of the plates, the plates being provided at points between their ends with curved slots, the inner ends of which are disposed toward the free end of the strip, a blade pivoted between the plates at a point in the vicinity of the free end of the strip and having angularly disposed edges adapted to engage the edge of the strip to hold the blade in an open or a closed position, the blade being provided at a point between its ends with a slot adapted to register with the slot in the said plate, the slot in the blade being curved and having its inner end disposed toward the free end of the strip and the blade being provided at its free end with an offset end portion adapted to extend over the spacer when the blade is in a closed position with relation to the plate, the body of the blade having parallel longitudinal edges, one of which engages the edge of the strip and the other lies flush with the slotted edges of the plate when the blade is in a closed position.

In testimony whereof I affix my signature.

LEONARD T. HINTON.